Figures 1, 2:
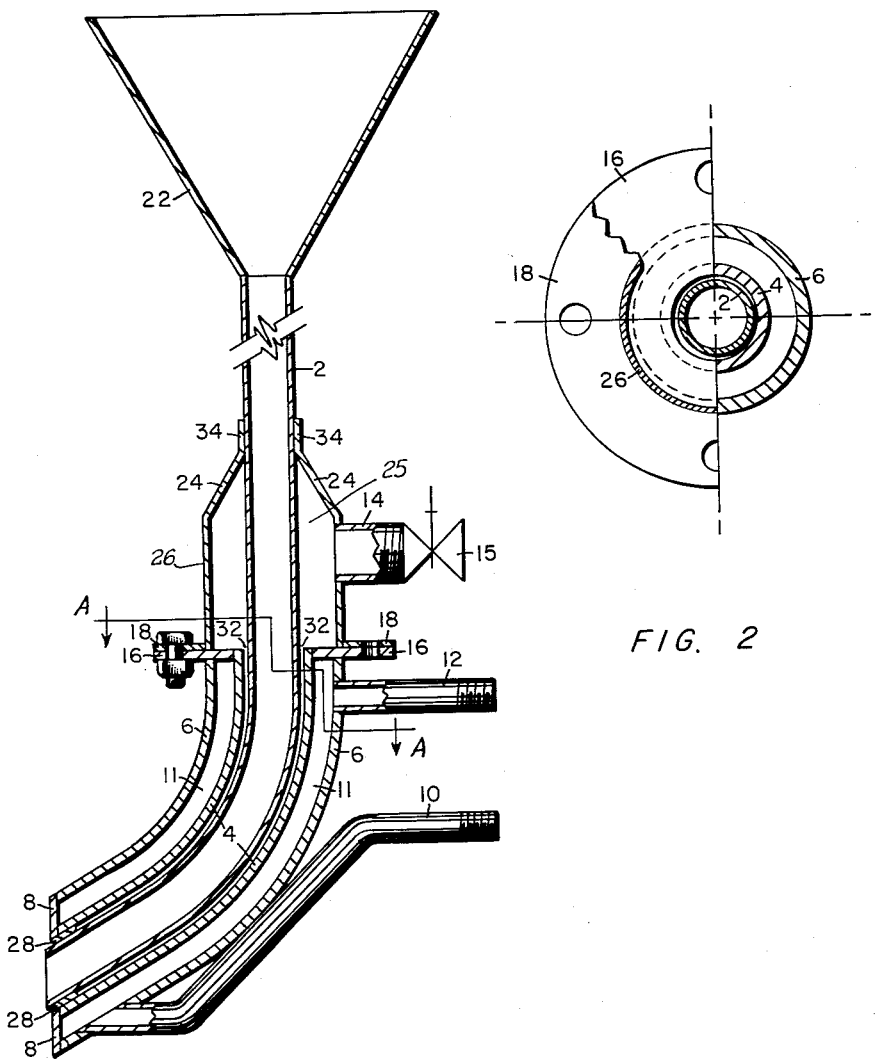

Dec. 5, 1961 R. M. WISEMAN 3,011,829
APPARATUS FOR DISCHARGING PARTICULATE MATERIAL
Filed March 23, 1959 2 Sheets-Sheet 1

INVENTOR
RUSSELL M. WISEMAN

BY Warburton & Cross
ATTORNEY

United States Patent Office 3,011,829
Patented Dec. 5, 1961

3,011,829
APPARATUS FOR DISCHARGING PARTICULATE MATERIAL
Russell M. Wiseman, Mentor, Ohio, assignor to Diamond Alkali Company, Cleveland, Ohio, a corporation of Delaware
Filed Mar. 23, 1959, Ser. No. 801,200
5 Claims. (Cl. 302—19)

The present invention relates to apparatus for delivering a particulate material to a heated area and more particularly to such apparatus wherein the particulate material is enveloped in a gaseous carrying medium as it is discharged from the apparatus.

Apparatus for discharging a particulate material into a desired area can be divided into three general categories. In the first category are those apparatus in which the particulate material is discharged by mechanical means, as for example, by an endless screw. In the second category are those apparatus in which the particulate material is discharged solely by the force of gravity. In the third category are those apparatus in which the particulate material is discharged by the force of a compressed gas, as for example, compressed air. However, all of the above types of discharging apparatus are subject to some disadvantage, particularly when used to discharge a particulate material into a heated area.

In the apparatus in the first category, wherein mechanical means such as an endless screw or a reciprocating piston are used to effect the discharge of the particulate material, the moving parts develop friction and hence are subject to considerable wear, thus requiring frequent replacement. Moreover, with this type of apparatus, it is impossible to project the particulate material any appreciable distance beyond the discharge end of the apparatus. This is a considerable disadvantage, particularly when the apparatus is used to inject the particulate material into a heated area, such as the heating zone of a Bessemer converter or an open hearth furnace. In such an operation, to insure that the particulate material will contact the molten metal within the heating area of such furnace, it is necessary to extend the apparatus into the furnace thereby subjecting a considerable portion of it to the furnace heat and the resulting corrosion.

Apparatus in the second category, wherein the particulate material is discharged solely by the force of gravity, although not subject to the disadvantage of friction and wear of moving parts found in the mechanical-type discharge apparatus are still subject to the disadvantage of not being able to project the particulate material an appreciable distance beyond the end of the apparatus. As set forth above, this is particularly disadvantageous when the apparatus is to be used to discharge particulate material into a heated area. Additionally, with this type of apparatus, hot gases from the heated area are drawn up into the discharge apparatus, thus frequently melting the particulate material contained therein and plugging the apparatus as well as subjecting it to appreciable corrosion. Moreover, the hot gases cause the gravity flow pipe to act as a chimney, thus, further hindering the flow of material.

Discharge apparatus, in the third category, wherein a compressed gas is used to discharge the particulate material, although capable of ejecting the material a considerable distance beyond the end of the apparatus, are subject to the disadvantage that the particulate material becomes aerated by the force of the compressed gas. Although in some instances, as for example when the particulate material is a powdered fuel which is being injected into a burner, this aeration may be desirable, in other instances, where, for example, the particulate material is added to a molten metal, the admixture of the material and the gas is not desirable in that the gas causes undesirable cooling of the metal. Moreover, the force of the gas on the particulate material causes it to spread over a considerable area, which spreading is detrimental when, for example, it is desirable to add the particulate material to a stream of molten metal as it enters the furnace.

It is, therefore, an object of the present invention to provide apparatus which can project a particulate material a considerable distance beyond the end of the apparatus but which apparatus is not subject to frictional wear.

Another object of this invention is to provide an apparatus which can project a particulate material for a considerable distance beyond the end of the apparatus, without aeration or excessive spreading of the particulate material.

A further object of the present invention is to provide apparatus for discharging a particulate material into a heated area, in which apparatus hot gases from the heated area will not be drawn up into the discharging apparatus thereby melting the particulate material and retarding or stopping its flow.

These and other objects will become apparent to those skilled in the art from the description of the invention which follows.

It has now been found that if discharge apparatus of the gravity type is provided with an annulus around at least a portion of its circumference at or near its discharge end, through which air or some other gas may be passed, particulate material which is discharged is carried in a gaseous envelope as it leaves the apparatus. In this manner, it is projected beyond the end of the apparatus for a distance greater than that which is possible when using gravity alone and, additionally, the particulate material is not aerated or spread out excessively, but rather, falls in a relatively compact mass.

Figure 3:
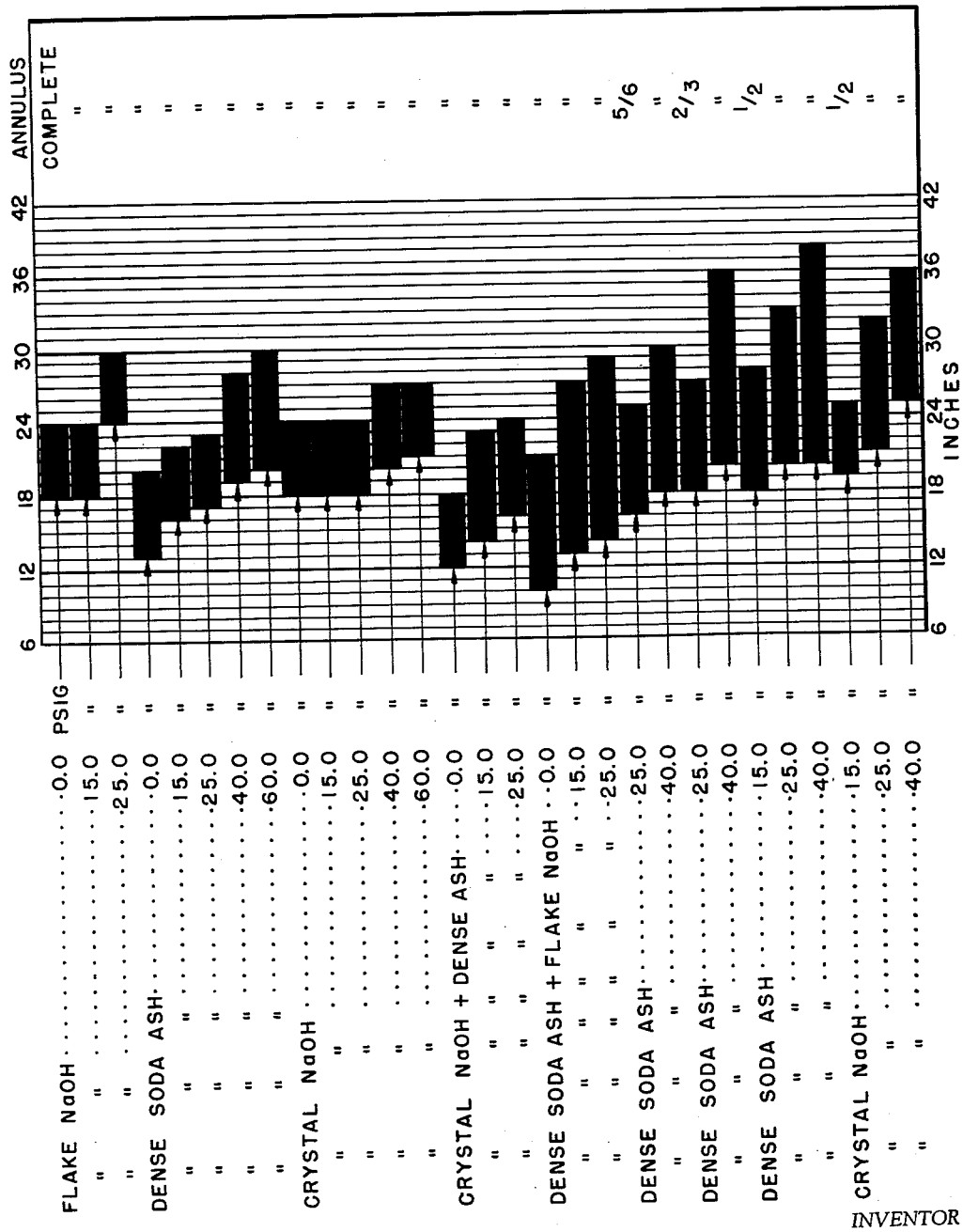

In the drawings which are attached hereto and form a part hereof, FIG. 1 is a vertical section of the apparatus of the present invention; FIG. 2 is a cross section taken on the line A—A of FIG. 1; FIG. 3 is a bar graph illustrating the amount of projection and pattern of various particulate materials, as obtained under varying pressure conditions.

The present invention envisions a discharging apparatus of the general type in which the particulate material is discharged solely by the force of gravity. This apparatus includes a tube which is substantially straight through a major portion of its length, at which it is curved near one end so as to discharge the particulate material at an angle to the major portion of the tube. To the opposite end of the tube is secured a suitable means for receiving the particulate material which is to be discharged. The apparatus is formed so as to have at least a partial annulus, through which a gas, as for example, air, oxygen, methane or the like may be delivered, which annulus is formed around at least a portion of the circumference of the central tube of the apparatus at or near its discharge end. It has been found to be desirable particularly where the apparatus is to be used to discharge particulate material into a heated area, such as a Bessemer converter or open hearth furnace, to provide the apparatus with a cooling jacket through which some cooling media such as water can be circulated. This cooling jacket may conveniently be formed as a double-walled cylindrically shaped member secured to the discharge end of the apparatus and spaced therefrom throughout its entire length so as to form the gas delivery annulus around the discharge end of the apparatus. Additionally, the apparatus of the present invention is formed with a gas chamber in communication with the gas annulus, which chamber is provided with a gas inlet through which any desired gas may be directed. An inlet and outlet are likewise in the cooling jacket so as to provide a means of ingress and egress for the cooling media.

In operation, the particulate material passing from the receiving means at the upper end of the central tube, through the central tube and discharging from the apparatus, is enveloped in a gaseous envelope formed by the gas which is discharged through the annulus surrounding the central tube. This gas envelope aids in carrying the particulate material, thus causing it to be projected a greater distance beyond the discharge end of the apparatus than is possible when using only the force of gravity. It is to be noted, however, that the particulate material is not propelled by the gas nor is the gas interspersed within the material, as in the prior art apparatus, so there is little or no aerating or scattering of the particulate material. Rather, as will be shown more fully hereinafter, the material is deposited in a relatively compact mass within a relatively restricted area.

It will be appreciated, that in order to obtain the most desirable results, both as to the distance the material is projected beyond the end of the apparatus and as to the compactness of the area in which it is deposited, the gas pressure which is used will vary as different particulate materials are used. Generally, pressures within the range of 5 to 60 p.s.i.g. have been found to be satisfactory with the preferred pressure range being about 15 to 40 p.s.i.g. With most particulate materials, extremely good results have been obtained using a pressure of about 25 p.s.i.g. However, the gas pressure actually used may be greater or less than this preferred pressure depending upon a number of factors, such as the density of the particulate material, its moisture content and particle size as well as the construction of the gas annulus, i.e., whether it is a complete or a partial annulus and whether the inner material tube is shorter than the jacket, thus shortening annulus length.

To illustrate the above, it has been found that where an extremely dense, large particled material is used, such as crystal sodium hydroxide, a pressure of 25 p.s.i.g. effects little or no projection of the material and it is not until a pressure of 40 p.s.i.g. is used that there is any appreciable projection. Similarly, it has been found that were a less dense material having a small particle size, such as dense sodium carbonate, is used, gas pressures of 15 p.s.i.g. or less effect a satisfactory projection of the material.

It has further been found, that by closing a portion of the gas delivery annulus at the discharge end of the central tube, so as to have available only a partial annulus through which the gas can pass, such as for example a ½ or ⅔ annulus, gas pressures which are less than the optimum pressure when using a full annulus will produce similar material projection and deposition patterns to those obtained when using the optimum pressure with a full gas annulus. Exemplary of this, when using a ½ annulus to discharge crystal sodium hydroxide, a pressure of 25 p.s.i.g. will give a projection of the particulate sodium hydroxide equivalent to that which is obtained when using 40 p.s.i.g. pressure and a complete annulus.

It will also be appreciated, that in some instances it will be desirable, while depositing the major portion of the particulate material in a relatively compact area, to project a portion of material beyond this area. This may be done, either by using a gas pressure above that which has been found to be the optimum pressure or by using only a partial annulus for the gas delivery tube with the optimum gas pressure or a lesser pressure or by a combination of both of the above. Thus, for example, where it is desired to deposit the major portion of a charge of crystalline sodium hydroxide in a relatively compact area and still project a portion of the charge beyond this area, this is achieved by using a gas pressure of 40 p.s.i.g., the optimum gas pressure when using a complete gas discharge annulus, with a partial gas delivery annulus, such as a ½ or ⅔ annulus. In this instance, the crystal sodium hydroxide will have a relatively large deposition pattern, but, the major portion of it will be deposited in a relatively compact area. From the above, it will be realized that although certain pressures have been designated as generally giving the most satisfactory results, when using a variety of particulate additives, under varying conditions of application, the gas pressures may be changed and it is not intended that the present invention should be limited to a specific range of gas pressure.

It will further be appreciated that other changes in the configuration of the gas discharge annulus as well as the central feed tube may be made which are within the scope of the present invention. For example, the length of the feed tube with respect to the surrounding water jacket, may be changed so that the feed tube is recessed within the water jacket or extends beyond the water jacket. Additionally, the configuration of the gas discharge annulus may be changed so as to form a venturi, thereby increasing the gas flow around the particulate material as it is discharged. It is believed that other similar alterations and changes will be apparent to those skilled in the art.

Referring now to FIG. 1 of the drawing, 2 is an elongated tubular member curved at its lower end so as to form an angle of about 30° with the horizontal and having a material receiving member 22 formed at its opposite end. A second, curved tubular member 4 with a diameter slightly greater than that of member 2 and having an annulus flange 16 secured to the upper end thereof, is positioned in a spaced relationship from member 2 by means of three spacer members 28, two of which are shown. A third, curved tubular member 6 is secured at its upper end to annular flange 16, forming with member 4 an annular chamber 11. Chamber 11 is closed at its lower end by annular plate 8, which plate is secured to the lower end of members 4 and 6. Through chamber 11, a cooling medium, such as water, is passed to effect cooling of the apparatus where it is used to discharge particulate material in a heated area. Member 6 has two conduits, 10 and 12, formed therein which conduits respectively are the means of ingress and egress of the cooling medium. Conduit 10 may be desirably formed with suitable valving means (not shown) by which the amount of cooling medium passing into the chamber 11 can be controlled.

Cylindrical member 26, having an annular flange 18 secured to its lower end, is secured by means of this flange to flange 16. Members 26 has formed at its upper end a conical section 24, which section is secured at its upper end to member 2 as shown at 34. Member 26 is spaced from member 2 and forms therewith a chamber 25, into which chamber a gas is passed by means of conduit 14, formed in member 26. Conduit 14 has incorporated therewith a suitable valving means 15 so that the amount of gas passing into the apparatus can be regulated.

In operation, particulate material is fed into the hopper means 22 from which it passes through member 2 under the force of gravity. Air or some other suitable gas is passed through conduit 14 into chamber 25, from which it passes through passageway 32 formed by members 4 and 2, discharging at the lower end of the apparatus as a gaseous envelope around the particulate material which is discharged from the central tubular member 2. As will be obvious to one skilled in the art, any suitable baffle means may be placed in the conduit 14 or the chamber 25, so as to insure an equal distribution of air or other gas in passageway 32.

When the particulate material is being added to a heated area, such as an open hearth furnace, a cooling medium is passed through conduit 10 into chamber 11 wherein it passes upwardly to the outlet conduit 12. It will be appreciated, that by passing the cooling medium upwardly through chamber 11, air locks or binding are prevented, thus effecting a more efficient cooling of the apparatus.

Although in the apparatus as described above, the gas delivery passage 32 has been shown as being formed with a complete annulus at its discharge end, it may also be formed with one or several segments of the annulus closed off, as for example, by an annular, perforated plate, or any other suitable means.

In testing the subject apparatus using various particulate materials and varying gas pressures, the following procedure is followed: The apparatus of the present invention is positioned so that the center of the discharge end of tube 2 is exactly 20 inches above the floor. The particulate material to be discharged is fed into hopper 22 at a rate so that it requires 1 minute for 6 lbs. of the material to pass through the apparatus. Beginning with 0 p.s.i.g. of air pressure and increasing the pressure up to as high at 60 p.s.i.g. in some instances, the amount of projection and deposition pattern or area of the particulate material is noted. The deposition pattern is determined by measuring the distance from the discharge end of the apparatus that the major portion of the particulate material is deposited.

In order that those skilled in the art may better understand the present invention and its mode of operation the following specific examples are given. In all of these examples, the test method as described above is used.

Example I

Flake sodium hydroxide have a density of about 50 lbs./cubic foot is passed through the apparatus of the present invention. Air is used as the projecting gas at pressures of 0, 15, and 25 p.s.i.g. The results obtained are as follows:

| Air pressure (p.s.i.g.): | Pattern, inches |
|---|---|
| 0 | 18–24 |
| 15 | 18–24 |
| 25 | 24–30 |

Example II

Crystal sodium hydroxide having a density of about 70 lbs./cubic foot is passed through the apparatus of the present invention. Air is used as the projecting gas at pressures of 0, 15, 25, 40 and 60 p.s.i.g. The results obtained are as follows:

| Air pressure (p.s.i.g.): | Pattern, inches |
|---|---|
| 0 | 18–24 |
| 15 | 18–24 |
| 25 | 18–24 |
| 40 | 20–27 |
| 60 | 21–27 |

Example III

Dense sodium carbonate having a density of about 66 lb./cubic foot is passed through the apparatus of the present invention. Air is used as the projecting gas at pressures of 0, 15, 25, 40 and 60 p.s.i.g. The results obtained are as follows:

| Air pressure (p.s.i.g.): | Pattern, inches |
|---|---|
| 0 | 13–20 |
| 15 | 16–22 |
| 25 | 17–23 |
| 40 | 19–28 |
| 60 | 20–30 |

Example IV

A mixture containing 50% by weight flake sodium hydroxide and 50% by weight dense sodium carbonate is passed through the apparatus of the present invention. Air is used as the projecting gas at pressures of 0, 15 and 25 p.s.i.g. The results obtained are as follows:

| Air pressure (p.s.i.g.): | Pattern, inches |
|---|---|
| 0 | 10–21 |
| 15 | 13–27 |
| 25 | 14–29 |

Example V

A mixture containing 50% by weight crystal sodium hydroxide and 50% by weight dense sodium carbonate is passed through the apparatus of the present invention. Air is used as the projecting gas at pressures of 0, 15 and 25 p.s.i.g. The results obtained are as follows:

| Air pressure (p.s.i.g.): | Pattern, inches |
|---|---|
| 0 | 12–18 |
| 15 | 14–23 |
| 25 | 16–24 |

Example VI

Dense sodium carbonate is passed through the apparatus of the present invention in which the area of the gas discharge annulus has been reduced at the discharge end by one-sixth, by closing off a one-sixth segment at the top of the annulus with modeling clay and tape. Air is used as the projecting gas at pressures of 25 and 40 p.s.i.g. The results obtained are as follows:

| Air pressure (p.s.i.g.): | Pattern, inches |
|---|---|
| 25 | 16–25 |
| 40 | 18–30 |

Example VII

Dense sodium carbonate is passed through the apparatus of the present invention in which the area of the gas annulus has been reduced by one-third at its discharge end, closing off a one-third segment at the top of the annulus with modeling clay and tape. Air is used as the projecting gas at pressures of 25 and 40 p.s.i.g. The results obtained are as follows:

| Air pressure (p.s.i.g.): | Pattern, inches |
|---|---|
| 25 | 18–27 |
| 40 | 20–36 |

Example VIII

Using the apparatus of the present invention in which the area of the gas annulus has been reduced by one-half at its discharge end by closing off a one-half segment of the annulus at the top with modeling clay and tape, separate runs are made using dense sodium carbonate and crystal sodium hydroxide. In all of these runs, air is used as the projecting gas at pressures of 15, 25 and 40 p.s.i.g. The results obtained are as follows:

| Material Used | Air Pressure (p.s.i.g.) | Pattern, inches |
|---|---|---|
| Dense Sodium Carbonate | 15 | 18–28 |
| Do | 25 | 20–33 |
| Do | 40 | 20–38 |
| Crystal Sodium Hydroxide | 15 | 19–25 |
| Do | 25 | 21–32 |
| Do | 40 | 25–36 |

The results obtained in all of the above examples are tabulated graphically in FIG. 3 of the drawings.

As is seen by the above examples, generally, an air pressure of 25 p.s.i.g. produces a very good projection for most materials. However, when using a less dense material, such as a mixture of flake sodium hydroxide and dense sodium carbonate, 15 p.s.i.g. of air pressure produces a projection which is substantially equivalent to that obtained with 25 p.s.i.g. of pressure. Additionally, it is seen when using the very dense, large particled crystal sodium hydroxide, no appreciable projection is obtained until an air pressure of 40 p.s.i.g. is used. However, when the area of the gas discharge annulus has been reduced by one-half at the discharge end, it is seen that air pressures of 15 or 25 p.s.i.g., used with crystal sodium hydroxide, provides at least an equivalent projection to that obtained when using an air pressure of 40 p.s.i.g. with a complete annulus.

It is thus seen that the apparatus of the present invention can be used with greatly varying gas pressures. It should further be appreciated, that the apparatus of the present invention is not limited for use only with the particulate materials disclosed in the above examples as other particulate materials can also be used with equally good results.

Although the apparatus of the present invention finds application in many and varied fields in which it is necessary to add a particulate material, it has been found to be particularly useful in the area of iron and steel desulphurization, particularly when used with the centrifugal rotating apparatus as described in Serial No. 613,044.

It is to be understood that although the invention has been described with specific reference to particular embodiments thereof, it is not to be so limited since changes and alterations therein may be made which are within the full intended scope of this invention as defined by the appended claims.

What is claimed is:

1. An apparatus for discharging a particulate material, wherein the particulate material is discharged solely by the force of gravity, said apparatus having means associated therewith for enveloping the particulate material in a gaseous envelope as it is discharged therefrom, without effecting any substantial aeration of the particulate material.

2. An apparatus for discharging a particulate material, wherein the sole propellant force for the particulate material is gravity, said apparatus having an annular gas delivering passageway formed around the apparatus adjacent the discharge end thereof, whereby the particulate material is enveloped in a gaseous envelope as it is discharged from the apparatus.

3. An apparatus for discharging a particulate material into a heated area comprising a central tubular member through which the particulate material is delivered solely under the force of gravity and a second tubular member surrounding said first member and forming therewith at least a partial annular passageway around substantially all of said first member adjacent its discharge end.

4. An apparatus for discharging a particulate material into a heated area comprising a central, tubular member, said member being curved at its discharge end, through which member a particulate material is passed solely by the force of gravity, a second curved, tubular member, which member surrounds said first member in a space therefrom, forming an annular passageway adjacent the discharge end of said first member and means for passing a gaseous medium through said passageway, thereby to envelop said particulate material in a gaseous envelope as it is discharged from said first member.

5. An apparatus for discharging a particulate material into a heated area comprising a tubular member through which the particulate material is delivered solely by the force of gravity, said member being curved at its discharge end, a second curved, tubular member surrounding said first member and being spaced therefrom, thus forming an annular passageway between said first and second members, which passageway surrounds the discharge end of said first member, a third curved, tubular member surrounding said second member and being spaced therefrom, forming a passageway between said second and third members, said passageway being closed at both ends to form a chamber through which a cooling medium is circulated, means for introducing a cooling medium into said chamber and means for removing said cooling medium therefrom, and means for introducing a gaseous medium into said passageway between the first and second members, thereby enveloping said particulate material in a gaseous envelope as it is discharged from said first member.

References Cited in the file of this patent
UNITED STATES PATENTS

| | | |
|---|---|---|
| 723,500 | Thofehrn et al. | Mar. 24, 1903 |
| 968,350 | Harrison | Aug. 23, 1910 |
| 1,128,059 | Schoop | Feb. 9, 1915 |
| 1,949,731 | Soldatoff | Mar. 6, 1934 |
| 2,829,960 | Vogt | Apr. 8, 1958 |